United States Patent [19]

Stubits et al.

[11] 4,041,179
[45] Aug. 9, 1977

[54] WATER DISPERSIBLE CHEWING GUM BASE

[75] Inventors: Marcella C. Stubits, St. Louis; James Teng, St. Louis County, both of Mo.

[73] Assignee: Anheuser-Busch, Incorporated, St. Louis, Mo.

[21] Appl. No.: 699,661

[22] Filed: June 25, 1976

[51] Int. Cl.$^2$ ............................................. A23G 3/30
[52] U.S. Cl. ........................................ 426/3; 426/4; 536/110
[58] Field of Search ...................................... 426/3–6; 260/233.5

[56] References Cited

U.S. PATENT DOCUMENTS 3,883,666  5/1975  Teng et al. ............................ 426/3

Primary Examiner—Jeanette M. Hunter
Attorney, Agent, or Firm—Gravely, Lieder & Woodruff

[57] ABSTRACT

Hydroxypropyl starch acetate having a degree of molecular substitution of hydroxypropyl radicals of about 3 to about 6 and a degree of substitution of acetyl groups of about 0.5 to about 0.9. The gum is dispersible in cold water, has good elasticity, excellent mouth feel, and excellent chewing quality.

5 Claims, No Drawings

4,041,179

WATER DISPERSIBLE CHEWING GUM BASE

BACKGROUND OF THE INVENTION

It has often been noticed that discarded chewing gum adheres to unwanted objects such as shoe soles, clothing, chair bottoms, carpeting, floors, etc. It would be desirable to be able to remove such gum from these areas without having to resort to organic solvents, since the solvent may not only dissolve the gum, but may also harm the object to which the gum is adhering. Thus, it is desirable to produce a chewing gum base which has the following characteristics:

1. excellent mouth feel, with no trace of slipperiness or sliminess,
2. dispersability in cold water so that it is easily removable from unwanted areas without necessitating the use of organic solvents,
3. good chewing quality so that it promotes the desire to chew.

Accordingly, one of the principal objects of the present invention is to provide a chewing gum which is readily dispersible in cold water so that it is easily removable from unwanted areas by means of cold water washing, while at the same time, maintaining an excellent mouth feel, good cohesion[1] and stretch[2], and remaining insoluble when chewed.

[1]Cohesion is the opposition offered to the teeth at the end of the bite as compared to the start. This property promotes the desire to chew.
[2]Stretch is that property which enables a sample to be pulled out in a ribbon to some length.

A further object is to provide a chewing gum having the foregoing properties which can be produced economically.

In U.S. Pat. No. 3,666,492 issued May 20, 1972 to Teng and Rha there is disclosed a fatty acid ester of starch, as a chewing gum base. The invention of U.S. Pat. No. 3,666,492 involves a saturated fatty acid having from 8 to 14 carbon atoms (specifically starch laurate), and a degree of substitution of above 2.

In U.S. Pat. No. 3,883,666 issued May 13, 1975 to Teng and Stubits there is disclosed a hydroxypropyl starch acetate, as a chewing gum base. The invention of U.S. Pat. No. 3,883,666 involves a hydroxypropyl starch acetate having a degree of molecular substitution of hydroxypropyl radicals of about 3 to about 6 and a degree of substitution of acetyl groups of about 1.0 to about 2.5. The gum base of U.S. Pat. No. 3,883,666 is entirely insoluble in both hot and cold water.

We have discovered a hydroxypropyl starch acetate with a degree of substitution of hydroxypropyl radicals of about 3 to about 6 and a degree of substitution of acetyl groups of about 0.5 to about 0.9. This hydroxypropyl starch acetate is suitable as a chewing gum base as it is an elastic, cohesive solid mass at temperatures of 35° C and higher. At these temperatures it possesses excellent chewing quality and good mouth feel. In addition to the foregoing properties, this gum disperses readily in cold water (20° C or below) to give a milky, or translucent dispersion.

This gum base has the following advantages over conventional gum bases:

1. Chewing gum made essentially of this gum base may be removed from unwanted places, e.g., children's hair, clothing, furniture, by simply washing with cold water, rather than by dissolving in organic solvents or by employing destructive mechanical means.

2. Compared to the gum made in accordance with U.S. Pat. No. 3,883,666 the cost is lower for the following reasons:

a. Less acetic anhydride is required for a lower degree of substitution.
 b. A large portion of free toluene separates from the low acetyl gum latex, and may be separated by decantation, rather than by distillation from the gum.
 c. A highly purified gum may be recovered by dissolving the crude gum in cold water, and then re-precipitating by heating.

SUMMARY OF THE INVENTION

This invention comprises a chewing gum base which is made from starch derivatives, more specifically, hydroxypropyl starch acetate having a low degree of substitution of acetyl groups. This gum base is unique in that it is dispersible in cold water while maintaining desirable chewing gum properties. This invention also relates to a process for preparing such gum base as hereinafter described and claimed.

DETAILED DESCRIPTION

Hydroxypropyl starch acetate is prepared by reacting propylene oxide with starch dispersed in an organic solvent, preferably toluene. Toluene is preferred because it is inert, water immiscible, high boiling, and a good solvent for the starch ether-ester. The starch is made alkaline by addition of an aqueous solution of sodium hydroxide. The reaction is catalyzed by means of the sodium hydroxide. The reaction mixture is maintained at a temperature ranging from 100 to about 110° C. The amount of time required for the reaction ranges from about 2 to about 4 hours.

The hydroxypropyl starch is then acetylated by reaction with acetic anhydride. After the acetylation reaction is complete, hydroxypropyl starch acetate gum can be recovered from the reaction mixture by any of several alternative methods.

In one method, a toluene-water emulsion is formed by adding 1 part by weight of warm water (40° C) to 3 parts by weight of the reaction mixture. The water layer is then drained off. The toluene-gum solution is washed with water, neutralized with a 20% aqueous sodium hydroxide solution, and again washed with water.

The latex is dissolved in 95% ethanol and then precipitated with water. The precipitate is heated in boiling water until all traces of solvent are removed. The remaining gum coagulates into a tough elastic mass.

In another method, the reaction product is neutralized with 25% aqueous sodium hydroxide. The resulting mixture is then washed with warm water. The toluene is thereupon removed by decantation and distillation. The latex is then dispersed in cold water and re-precipitated by heating or treating in boiling water. The coagulated gum is then dried in a forced air oven.

In a preferred embodiment of the invention, 3 to 4 parts of propylene exide is reacted with 1 part of starch (w/w) in toluene. Aqueous sodium hydroxide is added to the starch slurry for the purpose of accelerating the rate of reaction. The reactants are maintained at 100° to 110° C for 2 to 4 hours. 1 to 2 parts acetic anhydride are added to the mixture after hydroxypropylation is completed. About 2 to 3 parts of crude hydroxypropyl starch acetate is recovered from the mixture.

The crude gum is dissolved in 1 to 10 parts cold water (20° C) and the hydroxypropyl starch acetate gum is precipitated from the cold water by heating to 35° C or above.

The hydroxypropyl starch acetate precipitate is dried at 60° to 80° C in a forced air oven for about 4 to about 8 hours.

EXAMPLE I 800 grams of pearl starch is dispersed in 9,000 ml toluene in a Pfaudler reactor. 320 ml of 25% aqueous sodium hydroxide is added with rapid agitation.

4,000 ml propylene oxide is then added. The reactor is then sealed and purged with nitrogen four times at 70 psi.

The vessel is slowly heated from room temperature (25° C) to 110° C over a one-hour period. The mixture is held at 110° C for 2 hours, and then cooled to 50° C. 1,600 g acetic anhydride is added to the mixture and the resulting solution is stirred for 2 hours at 50°-55° C. The mixture is then cooled to 25° C.

Five liters of warm water (40° C) are added to the mixture. The resulting mixture is then stirred for 1 hour. The toluene-water emulsion which forms is allowed to separate into a toluene layer and a water layer, and the water layer is then drawn off.

The toluene-gum solution is washed with five liters of warm water three times, then neutralized with a 20% aqueous sodium hydroxide solution, and then washed once again to remove water soluble salts. The toluene gum solution is concentrated by steam distillation.

The resulting concentrate (2 liters) is dissolved in 2 liters of a 95% ethanol solution and precipitated with water. The precipitate is a white fluffy material. The precipitate is heated in boiling water until all traces of solvent are removed, and the gum is coagulated into a tough elastic mass.

The steamed gum contains 30% moisture, and has a smooth satiny mouth-feel, both before and after drying.

The material has an acetyl D.S. of 0.92. It is easily dispersed in water at 20° C and has a milky appearance.

EXAMPLE II 50 g of pearl starch is dispersed in 400 ml toluene in a two-liter Parr pressure reactor. 2.5 ml of 25% aqueous sodium hydroxide is added along with 200 ml of propylene oxide.

The mixture is heated to 110° C. The pressure will rise to 45 psi as the mixture is held at 110° C. As the propylene oxide is consumed, the pressure will fall to 20 psi.

50 ml acetic anhydride is added and the mixture is held at 55° C for 2 hours, then cooled, and then neutralized with 25% aqueous sodium hydroxide.

The mixture is washed with warm water (50° C). The toluene is then removed by distillation. The resulting gum is dispersed in 500 ml cold water (20° C). Then the dispersion is slowly poured into one gallon of boiling water.

The gum coagulates and is thereupon skimmed from the water surface, and then dried in a forced air oven at 70° C.

The gum has a smooth satiny mouth-feel with good elasticity. The gum remains an elastic cohesive mass in water at 40° C, but is readily dispersible in water at 20° C. The acetyl D.S. is 0.74.

EXAMPLE III 1,000 g of pearl starch is dispersed in 10 liters of toluene in a 10 gallon Pfaudler reactor. 400 ml of 25% aqueous sodium hydroxide is added with rapid agitation.

The reactor is sealed and purged with nitrogen three times at 45 psi.

5,000 ml propylene oxide is added under vacuum. The reactor is slowly heated from room temperature (25° C) to 110° C over a period of 1 hour. The mixture is held at 110° C for 2 hours. The mixture is then cooled to 25° C.

1,200 g acetic anhydride is added and the mixture is stirred at 55° C for 2 hours, then cooled to 25° C.

The mixture is neutralized with 30% aqueous sodium hydroxide, washed six times with warm water (60° C), and allowed to stand for 6 hours.

Upon standing, the mixture separates into three distinct layers - clear toluene, gum-toluene emulsion, and water.

About six liters of clear toluene are decanted from the surface of the gum emulsion.

The gum-toluene emulsion layer is then steamed for two hours to yield a stiff latex. The latex is dispersed in cold water (20° C) and reprecipitated by heating to 60° C.

The gum is then dried for 8 hours in a forced air oven at 70° C. Five pounds of elastic off-white material is obtained. This material has a D.S. of 0.50.

EXAMPLE IV

This example shows the preparation of chewing gum from the hydroxypropyl starch acetate base described in Examples, I, II, and III.

Base (Hydroxypropyl starch acetate); 17.3
Corn Syrup; 61.6
Powdered Sugar; 20.7
Water; 0.1
Glycerin; 0.1
Peppermint Oil; 0.2

The above ingredients are blended into a smooth tacky mass at 80° C, and divided into individual gum balls while still warm. The chewing gum ball became firm and brittle upon cooling, softened readily in the mouth and had excellent chewing properties.

The Chewing Test Rating performed in accordance with the method generally accepted in the trade for the chewing gum of Example IV is shown in the following Table and compared to commercial gum:

TABLE I

| | GUM CHEWING TEST | | | |
|---|---|---|---|---|
| Sample No. | 1 | 2 | 3 | 4 |
| | Commercial Gum, Sticks | Hydroxypropyl starch acetate M.S. 4.6 D.S. 0.92 | Hydroxypropyl starch acetate M.S. 4.4 D.S. 0.74 | Hydroxypropyl starch acetate M.S. 4.8 D.S. 0.50 |
| | | Initial Stage | | |
| Stiffness | 13 | 16 | 16 | 16 |
| Adhesion | 8 | 9 | 9 | 9 |
| | | Intermediate | | |
| Consistency | 10 | 10 | 8 | 6 |

TABLE I-continued

GUM CHEWING TEST

| Sample No. | 1 | 2 | 3 | 4 |
|---|---|---|---|---|
| Final Stage | | | | |
| Smoothness | 9 | 11 | 11 | 8 |
| Stiffness | 12 | 9 | 8 | 6 |
| Lift | 11 | 11 | 10 | 7 |
| Freeness to teeth | 10 | 9 | 9 | 9 |
| Cohesion | 11 | 12 | 12 | 13 |
| Stretch | 12 | 12 | 11 | 10 |
| Taste | 10 | 10 | 10 | 10 |

The numeral 10 is optimum in the foregoing Table and both above and below 10 are less than optimum.

TABLE II

NUMERICAL EVALUATION

| | | 0 | 10 | 20 |
|---|---|---|---|---|
| Initial | Flexibility | Brittle | Good | Floppy |
| | Stiffness | Raglike | Medium | Leathery |
| | Adhesion | Crumbly | Gummy | Tacky |
| Intermediate | Firmness of low point | Sloppy | Firm as final | |
| Final | Smoothness | Rough | Silky | Too slippery |
| | Stiffness | Soupy | Medium | Leathery |
| | Lift | Plastic | Round | Rubbery |
| | Freeness | Tacky | Free | |
| | Cohesion | Waxy | Slight wet paper | Too wet papery |
| | Stretch | Stringy | Full and wide | None (tears) |
| | Taste | Objectionable | None | |

The term "medium" as used above defines a chew which is between softness and firmness.

TERMINOLOGY

Initial Stage:

Consists of the first few bites before the gum is hydrated or warmed.

Flexibility describes the condition of the piece even before chewing and is self-explanatory.

Stiffness is the opposition offered to the teeth when bitten.

Adhesion when too high becomes tacky due to glucose rather than base and its low extreme is crumbly.

Intermediate Stage:

Is a temporary softness due to hydration before all sugar is removed and the cud approaches straight base.

Firmness at low point is the consistency of the base at maximum softness as compared to its consistency at the final stage of the chew.

Duration is self-explanatory.

Final Stage:

Is attained when sugar and glucose are removed.

Smoothness describes the feel of the cud (when flattened against the roof of the mouth) to the tongue.

Slippery or slimy is excessive smoothness. A satiny or sily feeling is desirable.

Stiffness is the opposition of the cud to the teeth at the start of the bite.

Lift is the capacity to obliterate or round out indentations in a cud caused by the tooth. It may be described as resilience or spring-back. The absence of lift is plasticity or waxiness.

Freeness is the absence of adhesion to the teeth.

Cohesion is the opposition offered to the teeth at the end of the bite as compared to the start. (The increment of increase in stiffness from the starch of the bite to the end.) It is desirable to have the increase in stiffness graduate throughout the bite rather than a sharp increase at the end of the bite.

Stretch is that property which enables a sample to be pulled out in a ribbon to arm's length.

Taste — A measure of the desirable lack of this quality in the base.

What is claimed is:

1. A hydroxypropyl starch acetate having elastic properties and having variable water solubility characteristics, said starch acetate having a degree of molecular substitution of hydroxypropyl groups of about 3 to about 6 and a degree of substitution of acetate group of about 0.5 to about 0.92.

2. The product of claim 1 wherein the hydroxypropyl starch acetate is soluble in water having a temperature of 20° C or lower.

3. The product of claim 1 wherein the hydroxypropyl starch acetate is an elastic cohesive mass in water having a temperature of 35° C or higher.

4. The product of claim 1 wherein the hydroxypropyl starch acetate may be separated from water soluble impurities by dispersion in cold water (below 20° C) and reprecipitation by heating (above 35° C).

5. Chewing gum comprising as an essential ingredient a chewing gum base of a hydroxypropyl starch acetate having a degree of substitution of acetate groups of about 0.5 to about 0.9.

* * * * *